(12) United States Patent
Wood et al.

(10) Patent No.: US 11,843,090 B2
(45) Date of Patent: Dec. 12, 2023

(54) BATTERY ELECTRODE PLATE PRODUCTION LINE AND METHOD

(71) Applicant: Wirtz Manufacturing Company, Inc., Port Huron, MI (US)

(72) Inventors: Edward F. Wood, Metamora, MI (US); Scott A. Mercurio, Clyde, MI (US); Robert N. Wirtz, Royal Oak, MI (US)

(73) Assignee: Wirtz Manufacturing Company, Inc., Port Huron, MI (US)

( * ) Notice: Subject to any disclaimer, the term of this patent is extended or adjusted under 35 U.S.C. 154(b) by 576 days.

(21) Appl. No.: 17/058,059

(22) PCT Filed: Jun. 4, 2019

(86) PCT No.: PCT/US2019/035332
§ 371 (c)(1),
(2) Date: Nov. 23, 2020

(87) PCT Pub. No.: WO2019/236542
PCT Pub. Date: Dec. 12, 2019

(65) Prior Publication Data
US 2021/0194090 A1 Jun. 24, 2021

Related U.S. Application Data

(60) Provisional application No. 62/680,143, filed on Jun. 4, 2018.

(51) Int. Cl.
*H01M 10/04* (2006.01)
*H01M 50/406* (2021.01)

(52) U.S. Cl.
CPC ..... *H01M 10/0404* (2013.01); *H01M 50/406* (2021.01)

(58) Field of Classification Search
CPC .................................................. H01M 10/04
See application file for complete search history.

(56) References Cited

U.S. PATENT DOCUMENTS

| | | | |
|---|---|---|---|
| 5,146,958 A | 9/1992 | Bugnet et al. | |
| 2002/0104412 A1* | 8/2002 | Marlow | B23D 25/12 83/903 |

(Continued)

FOREIGN PATENT DOCUMENTS

| | | |
|---|---|---|
| CN | 105390734 | 3/2016 |
| JP | 9-206481 A | * 11/1997 |

OTHER PUBLICATIONS

European Search Report for EP Pat. App. No. 19814754.8 dated Apr. 26, 2021. 9 pages.

(Continued)

*Primary Examiner* — Jeffry H Aftergut
(74) *Attorney, Agent, or Firm* — Reising Ethington P.C.

(57) ABSTRACT

A battery electrode plate assembly and a production line and method of making, pasting, and applying separators to substrates of battery electrode plate assemblies. The production line includes, in an embodiment, a paster, a cutter, and a transfer mechanism. The paster is configured to apply a battery paste to a first side of an elongate web of a separator material. The cutter is downstream of the paster and is configured to sever the pasted web into a series of separate and individual separators with paste on their first side. And the transfer mechanism is configured to dispose an individual separator of the series on one of a series of substrates with the pasted first side of the separator facing the substrate on which it is disposed.

21 Claims, 4 Drawing Sheets

(56) References Cited

U.S. PATENT DOCUMENTS

| | | |
|---|---|---|
| 2010/0075215 A1 | 3/2010 | Zhang |
| 2011/0146064 A1 | 6/2011 | Feaver et al. |
| 2011/0293988 A1 | 12/2011 | Obernyer et al. |
| 2014/0083562 A1 | 3/2014 | Mendoza et al. |
| 2017/0341163 A1 | 11/2017 | Mendoza et al. |

OTHER PUBLICATIONS

PCT/US2019/035332—International Search Report and Written Opinion dated Sep. 19, 2019.

\* cited by examiner

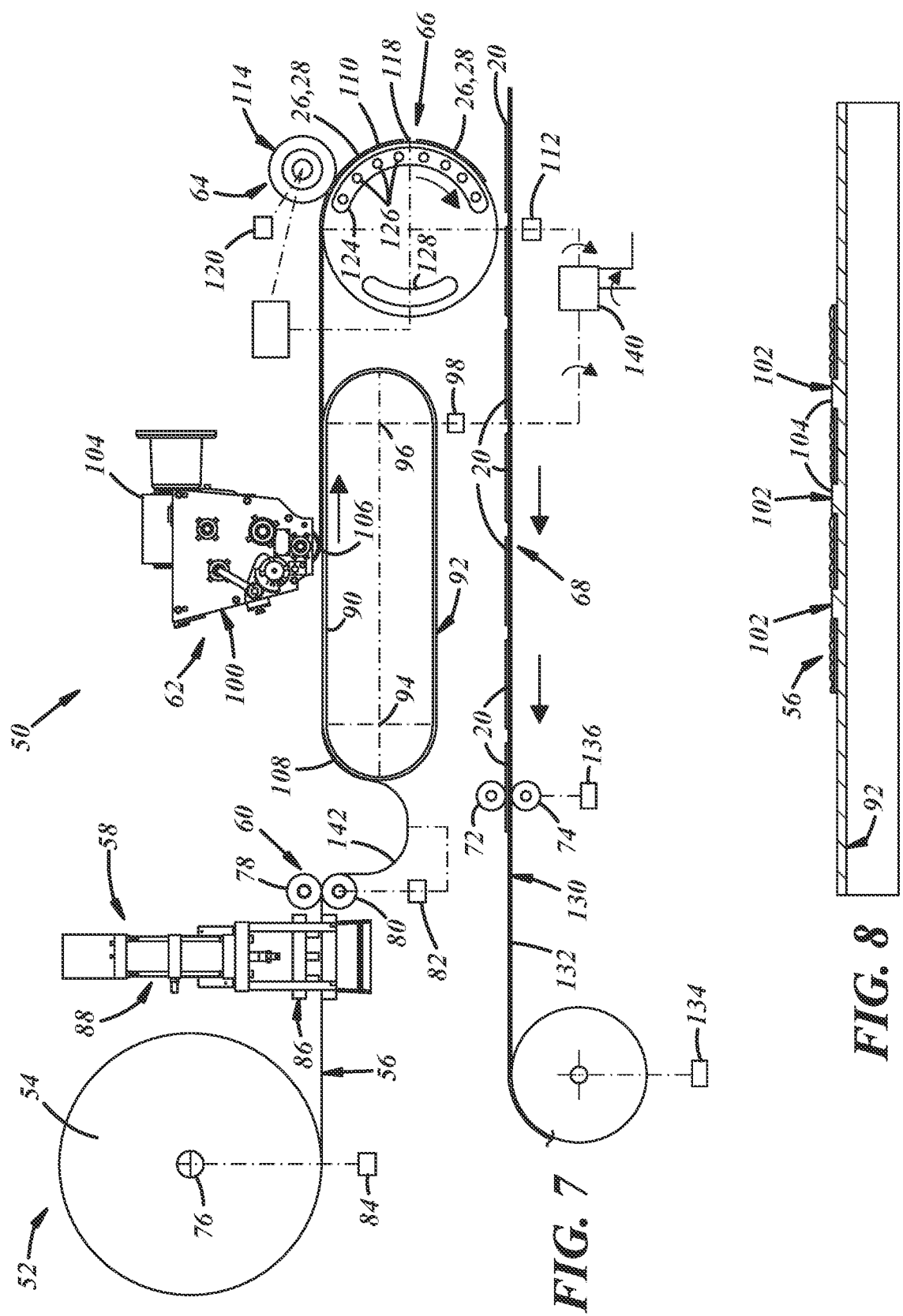

BATTERY ELECTRODE PLATE PRODUCTION LINE AND METHOD

REFERENCE TO CO-PENDING APPLICATION

This application claims priority to U.S. Provisional Application No. 62/680,143 filed Jun. 4, 2018, which is incorporated herein by reference in its entirety.

TECHNICAL FIELD

This disclosure relates to battery electrode plate assemblies and more particularly to a production line and method of making, pasting and applying separators to electrodes of battery plate assemblies.

BACKGROUND

Electric storage batteries may include bipolar plates and an electrolyte. A lead acid battery may include a plurality of bi-polar plates and a sulfuric acid electrolite. The bi-polar plate may include a frame or substrate with electrodes on both sides, an absorbent glass mat (AGM) separator with a positive paste (active material) applied to one of the electrodes and a negative paste with an AGM separator applied to the other electrode.

Prior approaches to applying the battery paste and an AGM separator to an electrode of a bi-polar battery plate have a low rate of mass production and require a significant capital investment for a specially designed production line and equipment to do so.

SUMMARY

A method of making, pasting and applying separators to substrates of a battery plate may include providing a longitudinally elongate web of separator material having first and second opposites sides, applying a layer of battery paste to one of the first and second sides of the web, severing the pasted web into a series of separate individual separators with paste on the one side, disposing a separate separator of the series on one of a series of substrates with the pasted one side facing the substrate on which it is disposed. To dispose an individual separator on a substrate, the separator may be turned over end for end by reversing its direction of travel relative to the direction of travel of the web before such separator was severed from the web. After an individual separator is disposed on its associated substrate such substrate may be turned over and the foregoing steps repeated to dispose another individual separator on the other side of such substrate.

The substrate may include a planar panel portion with at least one and usually a plurality of spaced apart protuberances projecting outwardly of both sides of the panel and before pasting a corresponding hole or holes may be formed through the web so that each pasted individual separator may be disposed on one substrate with each of the one or more protuberances received within a hole of the separator deposited on the one substrate. The substrate may include an edge extending around the panel and projecting outwardly thereof and each individual separator may be disposed within the edge of its associated substrate.

A mass production line for making, pasting and applying an individual separator to a substrate may include advancing a longitudinally elongate web of separator material through a paster to apply a layer of paste to one side of the web, severing the web to produce a series of separate individual separators of a desired predetermined length with paste on the one side, a transfer mechanism disposing an individual separator on one of a series of substrates with the pasted one side facing the substrate on which it is disposed. Upstream of the paster a wound roll of a web of separator material may be unwound from the roll and disposed on a moving belt advancing the web under a hopper of a pasting machine to apply paste to one side of the web, and downstream of the paster the pasted web may be received on a rotating transfer cylinder and the pasted web may be separated into individual separators on the cylinder. The cylinder may dispose one of the individual separators on one of a series of substrates being advanced with respect to the transfer cylinder. The transfer cylinder may have vacuum ports retaining the individual separators on the cylinder and the vacuum may be relieved to dispose the separators on the substrates. The separators may be disposed on substrates being advanced in a direction generally opposite to the direction in which the pasted web is being advanced upstream of the transfer cylinder.

Upstream of the paster, holes may be formed through the web to register with protuberances of a separator. The holes may be punched by a die and press mechanism or cut by rotary dies. The holes may correspond to protuberances in the substrate so that an individual separator may be deposited on a substrate with the protuberances received in the holes. A belt advancing the web through the paster may have protrusions or bosses registering with and received in the holes formed through the web so that paste is inhibited from being deposited in the holes.

BRIEF DESCRIPTION OF THE DRAWINGS

The following detailed description of certain embodiments and best mode will be set forth with reference to the accompanying drawings, in which:

FIG. 7 is a somewhat diagrammatic side view of the production line of FIG. 7; and FIG. 8 is an enlarged sectional view taken on line C-C of FIG. 7.

DETAILED DESCRIPTION

Figure 1:
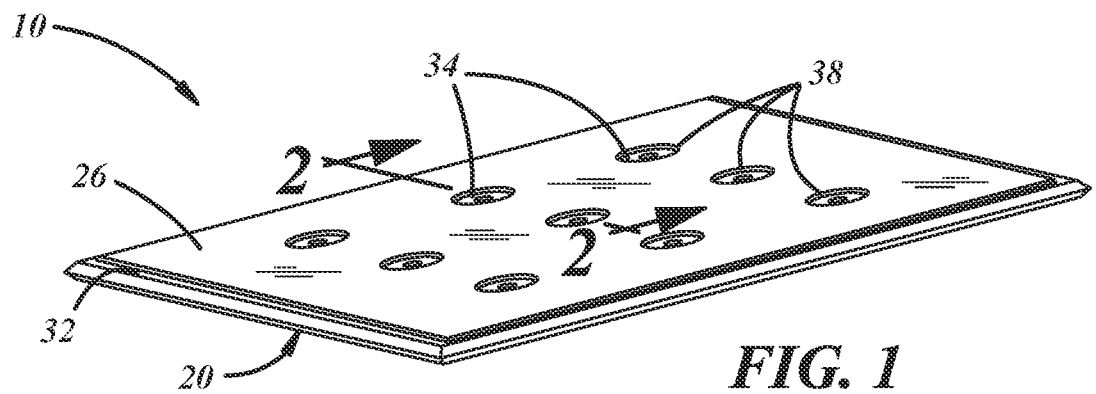
FIG. 1 is a pictorial view of a bipolar battery plate.
Figure 2:
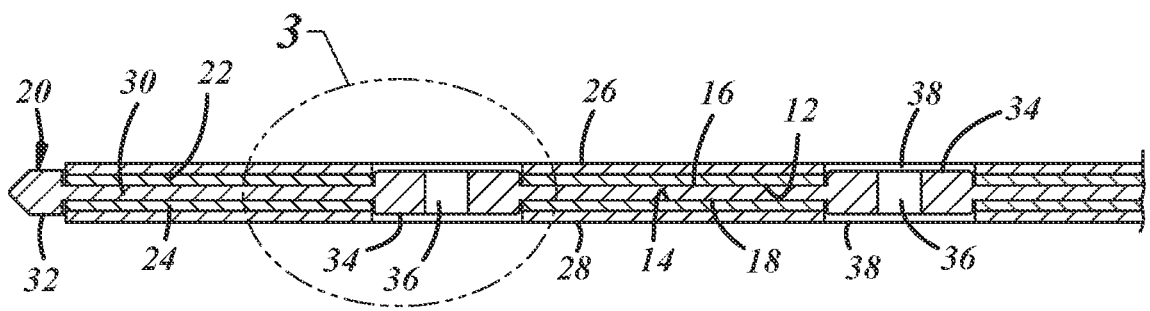
FIG. 2 is an enlarged sectional view taken on line A-A of FIG. 1.
Figure 3:
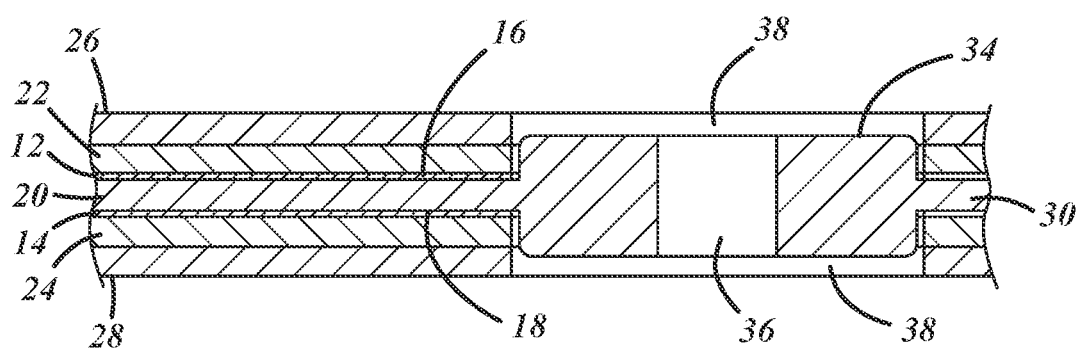
FIG. 3 is an enlarged fragmentary sectional view of a portion of FIG. 2 within the circle B.
Figure 4:
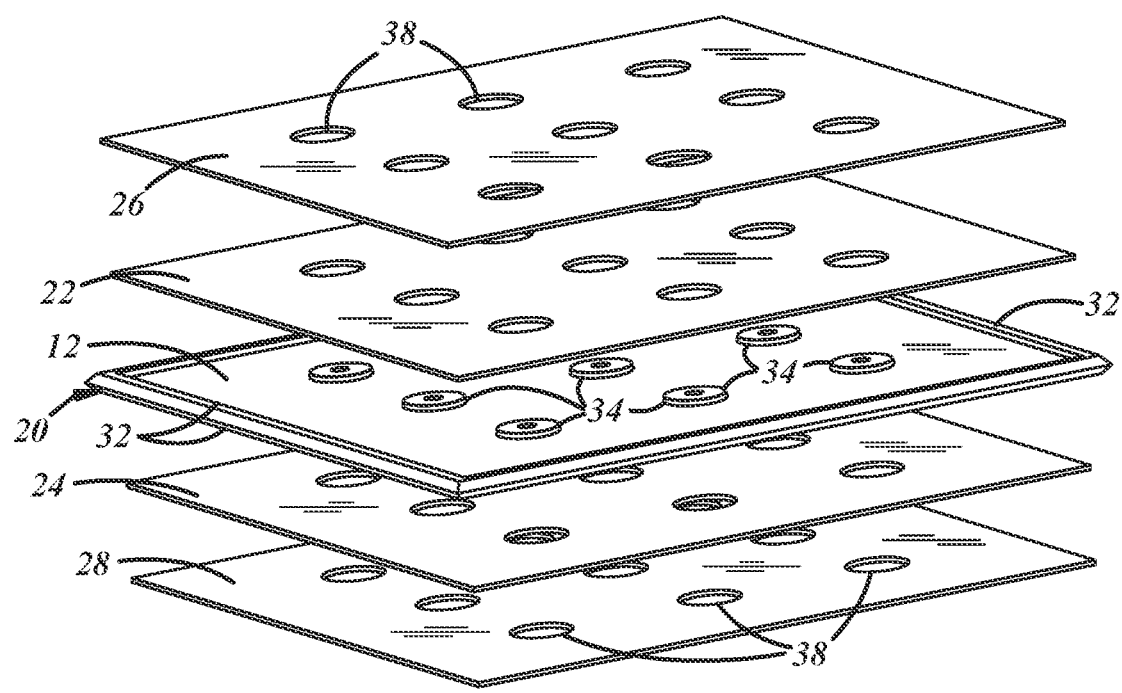
FIG. 4 is an exploded view of the bipolar plate of FIG. 1.
Figure 5:
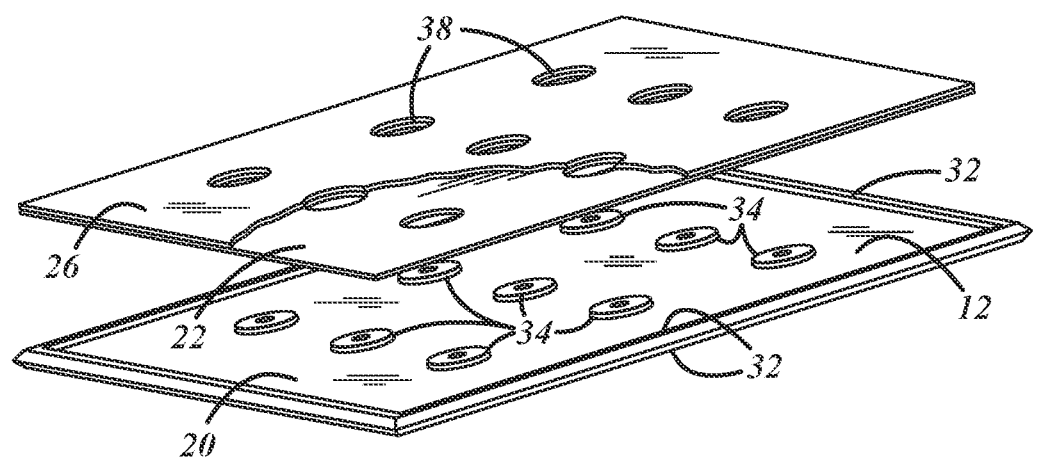
FIG. 5 is an exploded view of a portion of the battery plate of FIG. 1 illustrating a separator and a layer of paste before they are disposed on a substrate of the battery plate.

Referring in more detail to the drawings, FIGS. 1-4 illustrate a bipolar plate assembly 10 such as a plate for a lead acid battery with electrically conductive electrodes 12 and 14 received on opposed faces 16 and 18 of a frame or substrate 20 with a layer of paste 22 received on the electrode 16 with a separator 24 over the paste and a layer of paste 26 received on the electrode 18 with a separator 28 over the paste.

The substrate 20 may have a generally planar panel 30 with raised edges 32 extending around its perimeter and projecting outwardly from both faces 16 and 18 of the panel.

The electrodes, paste and separators may be received within the edges of the substrate. The panel may also include at least one and usually a plurality of spaced apart protuberances 34 arranged in a predetermined configuration and projecting outwardly of both faces of the panel. The protuberances 34 may have a circular perimeter and planar outer faces and at least some of the protuberances may have throughholes 36 which when assembled in a battery may provide channels or passages extending transversely through a series of stacked plates. The substrates 20 may be of a suitable plastic material which may be dielectric. The separators 26 and 28 may have clearance holes 38 in which the protuberances are received.

For a bipolar lead acid battery plate 10, the electrically conductive electrodes 16 and 18 may be a thin sheet of film or lead or lead alloy received on its associated face of the substrate and if desired may be attached to the substrate by a suitable adhesive. To provide an anode, one of the electrodes may be coated with a layer of negative paste (active material) and to provide a cathode, the other electrode may be coated with a layer of positive paste (active material), and the separators may be made of an absorbent glass mat (AGM) or other layer or film of a suitable porous material. The separators and the layers of paste may encircle the protuberances 34 but at least substantially do not overlay the outer faces of the protuberances. The construction of bipolar lead-acid battery plates and their assembly and use in a lead-acid battery is known and understood by persons skilled in the art and thus will not be further described.

Figure 6:
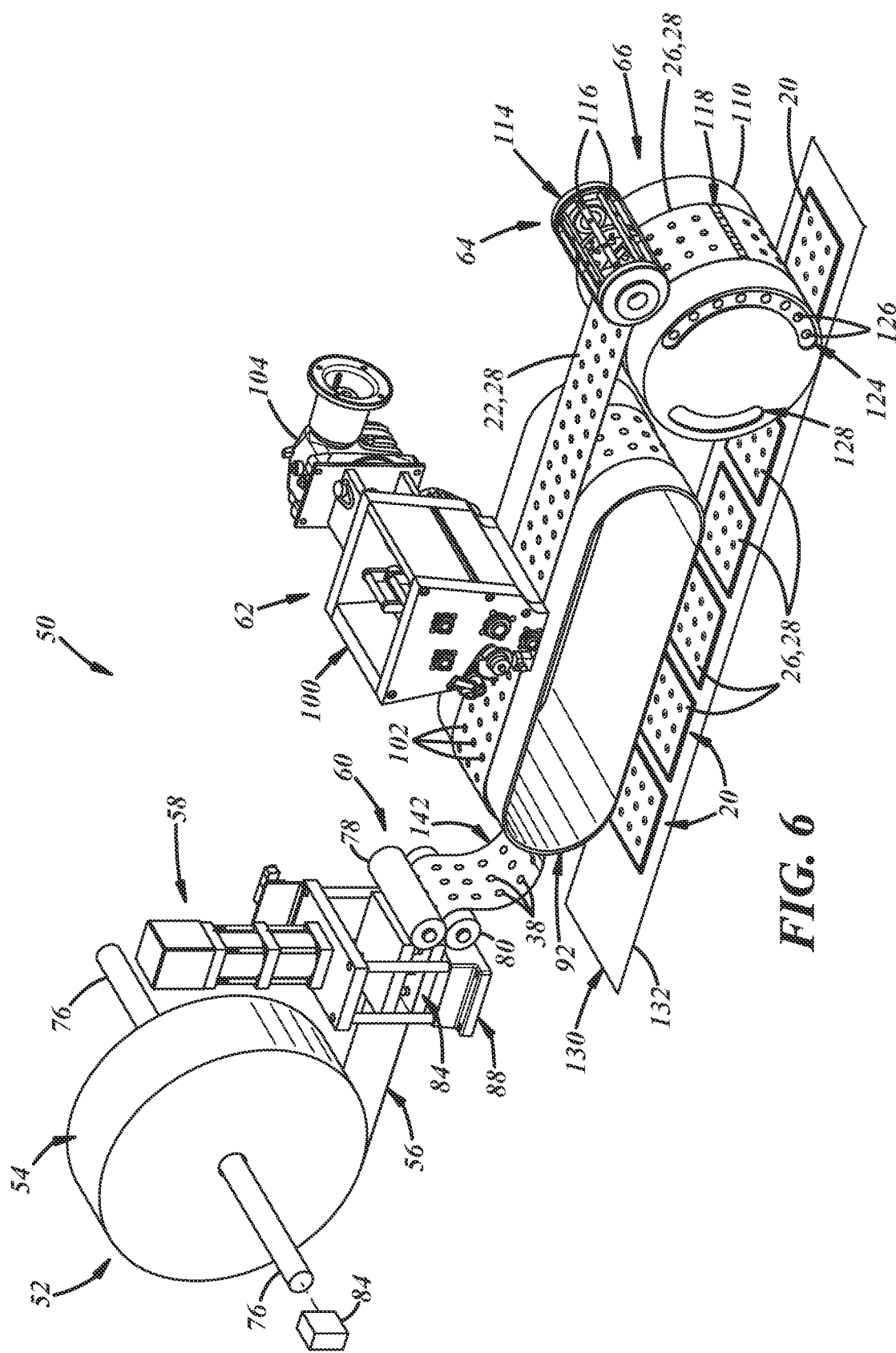
FIG. 6 is a pictorial and somewhat diagrammatic view of a portion of a production line for making and pasting separators and disposing them on substrates for making battery plates.

As shown in FIGS. 6-8 a mass production line 50 may make and paste a series of separators and apply them to one face of a series of separate substrates. The substrates may then be turned over and a second production line substantially the same as the first line 50 may make and paste a series of separators and dispose them on the other side of the series of substrates to provide battery plates with both electrodes having a layer of paste thereon covered by an associated separator. Typically, one of the production lines 50 would apply a positive paste on a separator received on one side of the substrate and the other line would apply a negative paste and an associated separator received on the other side of the substrate to provide a bipolar battery plate. Unipolar plates or end plates with paste and a separator on only one side of a plate may also be made by a production line 50.

As shown in FIGS. 6 and 7 the production line 50 may include an unwinding station 52 for a roll 54 of a longitudinally elongate web 56 of an absorbent glass mat (AGM), a station 58 forming clearance holes 38 through the web for receiving protuberances of substrates, a feed station 60 for unwinding the roll 54 of web and moving the web through the hole forming station, a pasting station 62, a cutter station 64 to sever the pasted web into separate individual separators 26,28 of a predetermined length, and a transfer station 66 to dispose an individual pasted separator on an associated one of a series of separate substrates 20 advanced through the transfer station such as by a conveyor 68. Downstream of the transfer station, desirably the pasted separator may be slightly pressed onto its associated substrate such as by passing them and an underlying portion of a conveyor belt 70 through the nip of a pair of rollers 72 and 74. This may provide a substantially uniform thickness of the substrates with the paste and separators thereon, ensure good contact of the paste with its associated electrode and sufficiently attach the separator to its associated pasted substrate to facilitate subsequent assembly of plates into a battery.

In the unwinding station 52, a roll of an elongate web 56 of separator material such as an AGM may be received on a rotatable arbor 76 and in operation of the line unwound by the web passing through the nip of a pair of feed rollers 78,80 driven for corotation by a desirably variable speed electric motor 82 such as a stepper motor. An adjustable air brake 84 may be connected to the arbor to maintain the web in tension or taut between the feed rollers 78,80 and the roll 54 of the web as it is being unwound. If the substrate includes protuberances 34, corresponding clearance holes 38 may be formed in the web in the station 58 such as by punching dies 86 received in and actuated by a press 88. Alternatively, the clearance holes in the web could be formed by a pair of rotary dies through the nip of which the web passes with the tangential speed at their nip being the same as the linear speed at which the web is advanced through the forming station by the feed rollers 78,80. The pair of rotary cutting dies may be driven by a variable speed motor such as a stepper motor synchronized with the speed of the feed rollers which may be driven desirably by another stepper motor 82. Optionally, the hole forming station 58 can be eliminated and any desired clearance holes formed in the web 56 before it is wound into a roll and placed on the arbor 76 of the unwinding station.

In the paster station 62 the web may be received on a upper run of a continuous belt 92 received over a pair of spaced apart rollers 94,96 journaled for rotation with preferably the downstream roller being driven by a variable speed electric motor 98 such as a stepper motor to advance the web under a paste hopper 100 and through the paster station 62. The belt may be made of stainless steel and as shown in FIG. 8 may include circular protrusions or bosses 102 in a configuration complimentary to and received in the corresponding clearance holes 38 in the web and desirably having an outer substantially planar face 104 substantially in the plane of the upper face of the web 56 to inhibit paste applied to the upper face of the web from entering the clearance holes in the web. The paste hopper 100 may be of conventional construction and in operation may discharge paste through an orifice 106 onto the upper or first surface 108 of the web as it is advanced under the orifice. The orifice may extend substantially across the transverse width of the web.

Downstream of the paster station, the pasted web may pass into the transfer station 66 and be received on the periphery of a transfer cylinder 110 journaled for rotation and driven by a variable speed motor 112 such as a stepper motor. Desirably, while the web is on the transfer cylinder it may be severed into a series of succeeding separate individual pasted separators 26,28 such as by a cutter assembly 114 journaled for rotation and having at least one and desirably a plurality of cutter blades 116 of sufficient length to extend transversely across the web. The speed of rotation of the cutter blades 116 may be synchronized with the rotary speed of the transfer cylinder 110 to provide the desired predetermined length of each individual separator 26,28 with the web being severed in the nip between a rotary blade and the transfer cylinder. The tangential velocity or speed of the periphery of the transfer cylinder may be greater than the immediately upstream speed of the web when it engages with the cylinder to provide a gap or spacing 118 between adjacent individual separators received on the transfer cylinder. This may also maintain tension on the pasted web before it is severed. The cutter blades may be rotated by a variable speed motor 120 such as a stepper motor.

The individual separators 26,28 may be retained on the transfer cylinder 110 by a vacuum applied to a plurality of circumferentially and axially spaced apart ports 122 opening onto the periphery of the cylinder and underlying the individual separators. As the transfer cylinder rotates it may depose an individual pasted separator onto one of a series of substrates 20 by interrupting or stopping the vacuum applied to the ports preferably sequentially and if need be by applying preferably sequentially an atmospheric or superatmospheric pressure to the ports. Vacuum retaining and atmospheric or super atmospheric release pressure may be supplied to the ports through adjustable slip rings 124 communicating with generally axially extending passages 126 in the transfer cylinder communicating with the ports which open into the passages. If desired, after the vacuum ports have released and deposited an independent separator on a substrate they may be rotatably advanced to communicate with slip rings 128 supplying to them a super atmospheric pressure to clean them before they are further rotated to receive and retain another individual pasted separator severed from the web.

The substrates 20 may be advanced under the transfer cylinder 110 by a conveyor 130 which may include a continuous belt 132 with a run underlying the transfer cylinder and carrying thereon a series of equally spaced apart substrates 20. This conveyor belt may be driven by a variable speed motor 134 such as a stepper motor to advance the substrates under the transfer cylinder at the same or substantially the same linear speed as the tangential peripheral speed of the pasted surface of the individual separators. Each separator 26,28 may be released from the transfer cylinder 110 and deposited on an underlying substrate 20 with its clearance holes 38 in registration with the substrate protuberances 34 and within the boundary of the edges 32 of such substrate.

Downstream of the transfer cylinder, if desired each substrate with a pasted separator received thereon may pass through the nip of cylindrical rotating rollers 72 and 74 to apply a force urging a separator onto its associated substrate. Desirably these rollers are driven by a variable speed stepper motor 136 at the same tangential speed of their nip as the linear speed at which the combined separator, paste and substrate is advanced through the rollers.

In operation of the production line 50, the various variable speed motors such as stepper motors may be controlled by a suitable conventional electronic controller 140 (known to skilled persons) to synchronize their various speeds and phase relationship of operation. For example, the speed of a preferably stepper motor 98 driving the paster belt 92 may be set to provide the desired rate of production and used as the set point for the speed and synchronization of separate preferably stepper motors operating each of the paste hopper 100, hole forming station punching 58 or rotary dies, rotating the transfer cylinder 110, and driving the conveyor 130 advancing the substrates 20 relative to the transfer cylinder 110. To provide the desired length of the individual separators 26,28, the speed and synchronization of the preferably stepper motor 120 driving the cutter assembly (severing the web into individual separators) may also be varied and synchronized relative to the speed at which the transfer 110 cylinder is rotated.

The speed of the web feed rollers 78,80 may be varied and synchronized relative to the speed at which the paster belt 92 is advanced to maintain a slack loop 142 of the web between the feed rollers and the paster belt. This maintaining of the length or depth of the slack loop may be accomplished in various ways such as by synchronizing the speed of the feed rollers with the speed at which the belt 92 advances the web under the paste hopper 100 or more simply by sensors determining a minimum and maximum vertical depth of the slack loop 142 and providing signals to control the speed at which the feed rollers driven by the motor 82 advance the web to maintain the loop between the desired maximum and minimum depth of the slack loop. The speed or cycling of the hole forming station press 88 operating the punching dies 86 or the speed of the rotary cutting dies may be varied and synchronized with the speed at which the feed rollers 78,80 advance the web through the hole forming station 58. The magnitude of the resistance to the unwinding rotation of the web roll produced by the air brake 84 may also be controlled relative to the extent to which the web is unwound and advanced by the feed rollers and if desired may be increased as the radius or diameter of the web roll 54 decreases as it is being unwound.

It is believed that this production line can make, paste and dispose on substrates at least 100 lineal feet per minute of pasted separators disposed on the substrates. This production line could also be configured to simultaneously run two separate parallel webs side by side to produce at least 200 lineal feet per minute of pasted separators disposed on substrates.

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A line for making, pasting and applying separators to substrates for battery plates comprising:
    a paster configured to apply a battery paste to a first side of an elongate web of a separator material;
    a cutter downstream of the paster configured to sever the pasted web into a series of separate individual separators with paste on their first side; and
    a transfer mechanism configured to dispose an individual separator of the series on one of a series of substrates with the pasted first side of the separator facing the substrate on which it is disposed.

2. The line of claim 1, wherein the substrates include at least two protuberances and upstream of the paster the web includes throughholes configured to register with the protuberances, and the paster includes a belt with an outer face having protrusions which register with the holes in the web and inhibit paste applied to the first face of the web from being disposed in the holes.

3. The line of claim 1, wherein the transfer mechanism includes a rotatable cylinder on which individual substrates are received, releasably retained thereon and released and disposed on an associated substrate.

4. The line of claim 1, wherein the transfer mechanism includes a rotatable cylinder on which individual substrates are received and releasably retained by a plurality of ports opening onto the periphery of the cylinder and underlying the individual separators, and thereafter individual separators are released from the cylinder by at least decreasing vacuum applied to the ports and disposed on an associated substrate.

5. The line of claim 4, wherein the individual separators on the rotatable cylinder are released by applying an atmospheric or a superatmospheric pressure to the ports underlying the separators.

6. The line of claim 3, wherein the cutter includes at least one blade extending transversely across the web and journaled for rotation to sever the web into separate individual separators in a nip between the at least one blade and the rotatable cylinder as the pasted web passes through the nip.

7. The line of claim 4, wherein the cutter includes at least one blade extending transversely across the web and journaled for rotation to sever the web into separate individual separators in a nip between the at least one blade and the rotatable cylinder as the pasted web passes through the nip.

8. The line of claim 5, wherein the cutter includes at least one blade extending transversely across the web and journaled for rotation to sever the web into separate individual separators in a nip between the at least one blade and the rotatable cylinder as the pasted web passes through the nip.

9. The line of claim 1, wherein the transfer mechanism overturns the individual separators end for end and deposes them on an associated substrate.

10. The line of claim 1, which also comprises a conveyor advancing a series of substrates relative to the transfer mechanism as individual separators are deposited on the substrates by the transfer mechanism.

11. The line of claim 3, which also comprises a conveyor advancing a series of substrates relative to the rotatable cylinder as individual separators are deposited on an associated substrate by the rotatable cylinder.

12. The line of claim 3, which also comprises a pressing mechanism downstream of the rotatable cylinder which is configured to press an individual separator onto its associated substrate.

13. The line of claim 4, which also comprises at least one pressure roller downstream of the rotatable cylinder which forces the separators onto their associated substrates.

14. The line of claim 3, which also comprises downstream of the rotatable cylinder a pair of rollers through the nip of which substrates with the individual separators thereon pass to force the separators onto their associated substrates.

15. The line of claim 1, which also comprises upstream of the paster a rotatable arbor configured to receive a roll of the web and downstream of the arbor and upstream of the paster, feed rollers through which the web passes as it is uncoiled from the roll of the web on the arbor.

16. The line of claim 15, which also comprises downstream of the arbor and upstream of the feed rollers a mechanism forming a predetermined configuration of holes through the web.

17. The line of claim 15, which also comprises downstream of the arbor and upstream of the feed rollers a set of rotary dies through which the web passes to form a predetermined configuration of a plurality of holes through the web.

18. A method of making, pasting, and applying separators to substrates for battery plates comprising:
providing a longitudinally elongate web of a separator material having first and second opposite sides;
applying a layer of battery paste to a first side of the web of separator material;
severing the pasted web into a series of separate individual separators with paste on the first side; and
disposing a separate separator of the series on one of a series of substrates with the pasted first side facing the substrate on which it is disposed.

19. The method of claim 18, which also comprises turning over end for end the individual separators by reversing the direction of travel of the individual separators relative to the direction of travel of the web before the individual separators were severed from the web, and disposing each turned over separator on one of the series of substrates.

20. The method of claim 18, which also comprises before applying the layer of paste to the web forming a plurality of holes through the web to register with protuberances on the substrates, and removably inserting a plug into the holes to inhibit a layer of paste from entering the holes.

21. The method of claim 20, wherein the depositing of separators on the substrates includes registering the holes with the protuberances on the substrates so that the holes encircle the protuberances and the substrates do not overly at least part of the outer faces of the protuberances.

* * * * *